United States Patent
Nakada

(10) Patent No.: US 7,712,936 B2
(45) Date of Patent: *May 11, 2010

(54) VEHICLE LIGHTING UNIT

(75) Inventor: Yusuke Nakada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/100,077

(22) Filed: Apr. 9, 2008

(65) Prior Publication Data

US 2008/0253142 A1    Oct. 16, 2008

(30) Foreign Application Priority Data

Apr. 10, 2007    (JP)    ............... 2007-103188

(51) Int. Cl.
*B60Q 1/02* (2006.01)

(52) U.S. Cl. .............. 362/539; 362/538; 362/508

(58) Field of Classification Search .......... 362/507, 362/539, 521, 538, 543–545, 549
See application file for complete search history.

(56) References Cited

U.S. PATENT DOCUMENTS

| | | | | |
|---|---|---|---|---|
| 6,891,333 B2* | 5/2005 | Tatsukawa et al. | ............ | 315/82 |
| 7,316,495 B2* | 1/2008 | Watanabe et al. | ........... | 362/545 |
| 7,410,282 B2* | 8/2008 | Eichelberger et al. | ....... | 362/545 |
| 7,419,290 B2* | 9/2008 | Inaba | .......................... | 362/538 |
| 2007/0133220 A1* | 6/2007 | Watanabe et al. | ........... | 362/538 |
| 2007/0183168 A1* | 8/2007 | Naganawa et al. | .......... | 362/545 |
| 2007/0201241 A1* | 8/2007 | Komatsu | .................... | 362/545 |

FOREIGN PATENT DOCUMENTS

| | | |
|---|---|---|
| DE | 100 37 196 A1 | 2/2001 |
| DE | 103 44 130 A1 | 4/2005 |
| JP | 2004-095481 A | 3/2004 |

OTHER PUBLICATIONS

Patent Abstracts of Japan, Publication No. 2004-095481, Publication Date: Mar. 25, 2004, 1 page.
EPO Communication with Search Report from Application No. 08154160.9 dated Jul. 1, 2008 (7 pages).

* cited by examiner

*Primary Examiner*—Hargobind S Sawhney
(74) *Attorney, Agent, or Firm*—Osha • Liang LLP

(57) ABSTRACT

A vehicle lighting unit is provided with: a projection lens arranged on a lens center axis extending in a longitudinal direction of a vehicle; a light source arranged on a rear side of a rear focal point of the projection lens; a reflector for reflecting forward a light from the light source toward the lens center axis; and a shade. An upper end edge of the shade passes in a vicinity of the rear focal point of the projection lens to shield a part of a reflected light from the reflector. An optical axis of the reflector is shifted from the lens center axis that is set to pass through an upper end edge of the shade so that the optical axis of the reflector is apart from the upper end edge.

2 Claims, 8 Drawing Sheets

VEHICLE LIGHTING UNIT

This application claims foreign priority from Japanese Patent Application No. 2007-103188 filed on Apr. 10, 2007, the entire contents of which are hereby incorporated by reference.

BACKGROUND OF THE INVENTION

1. Field of the Invention

The present invention relates to a vehicle lighting unit and, more particularly, a projector-type vehicle lighting unit used as a passing-beam (lower beam) headlight.

2. Background Art

Nowadays a projector-type headlight is often employed as the vehicle lighting unit. This projector-type headlight is equipped with a projection lens arranged on a lens center axis extending in the longitudinal direction of the vehicle, a light source arranged on the rear side of the rear focal point of this projection lens, and a reflector for reflecting forward a light from this light source to go toward the lens center axis.

When this projector-type headlight is used as the passing-beam headlight, a shade for shielding a part of the reflected light from the reflector to remove an upward illumination light is provided between the projection lens and the reflector. Accordingly, a passing-beam light distribution pattern having a light-shade boundary line is formed (see JP-A-2004-095481, for example).

A basic light distribution pattern for the passing-beam light distribution pattern is a light distribution pattern having a light-shade boundary line that is formed by projecting a shape of an upper end edge of the shade. In the light-shade boundary line, an opposite lane side is constructed by a horizontal cut-off line and an own lane side is constructed by an oblique cut-off line that rises leftward from the horizontal cut-off line at an angle of 15°. Also, in this basic light distribution pattern, a hot zone (high luminous intensity area) is formed under and near the right end portion of the oblique cut-off line of the light-shade boundary line.

However, in the above projector-type headlight in the background art, normally a focal position of the projection lens is set to the upper end edge of the shade during the passing-beam light distribution. Therefore, an almost half of the upward illumination light is removed by the shade, and particularly a part of the hot zone is cut by the oblique cut-off line of the light-shade boundary line. As a result, such a problem existed that a utility factor of the light is low. Also, there are some shades to which a mirror process has not been applied. In this case, a loss due to a reflection not a little occurs.

SUMMARY OF THE INVENTION

One or more embodiments of the invention provide a vehicle lighting unit capable of reducing a quantity of light cut by a shade and shifting a high luminous intensity area to the own lane side.

In accordance with one or more embodiments of the invention, a vehicle lighting unit is provided with: a projection lens arranged on a lens center axis that extends in a longitudinal direction of a vehicle; a light source arranged on a rear side of a rear focal point of the projection lens; a reflector for reflecting forward a light from the light source to go toward the lens center axis; and a shade arranged such that an upper end edge passes through the rear focal point of the projection lens to shield a part of a reflected light from the reflector. An optical axis of the reflector is shifted from the lens center axis that is set to pass through an upper end edge of the shade to go away from the upper end edge.

According to the vehicle lighting unit constructed as above, the high-density luminous flux that is located near the optical axis of the reflector and removed largely in the background art can be incident on the projection lens not to largely interfere with the upper end edge of the shade. Therefore, a quantity of removed light of the high luminous intensity area (hot-zone) that is cut by the upper end edge the shade can be reduced, and the high luminous intensity area can be shifted to the own lane side.

In the vehicle lighting unit constructed as above, the optical axis of the reflector may be shifted in parallel to the lens center axis on an own lane side in a vehicle width direction.

According to the vehicle lighting unit in which the optical axis of the reflector is displaced in parallel from the lens center axis to the own lane side in the vehicle width direction on the upper end edge of the shade, the light that is not incident on the projection lens on account of an optical axis displacement can be suppressed to a minute amount generated only by the shift.

In the vehicle lighting unit constructed as above, the light source may be fixed to a supporting member, the reflector may be held by a pair of engaging base portions, which are provided to project from the shade on both left and right sides, from an outside and fixed, and distances from the engaging base portions on both left and right sides to the lens center axis may be set differently in response to an amount of shift of the optical axis of the first main reflector.

According to the vehicle lighting unit constructed as above, the structure for shifting the optical axis of the reflector is provided only to the shading member. Therefore, the reflector is shifted rightward and fixed to the shade for the purpose of right light distribution, while the reflector is shifted leftward and fixed to the shade for the purpose of left light distribution.

As a result, a displacement of the optical axis of the reflector can be handled only by forming the engaging base portions into a different shape respectively in the situation that the shade having different shapes every used area for the purpose of right light distribution and left light distribution must be designed, and thus the reflector can be used as the common use component.

Also, when the shade/the reflector and the light source/the supporting member are fixed separately, the shade/the reflector can be formed of a lightweight resin, though inferior in thermal resistance, while using the supporting member as the heat radiating member.

According to the vehicle lighting unit according to one or more embodiments of the invention, the high-density luminous flux near the optical axis of the reflector removed largely in the background art can be incident on the projection lens not to greatly interfere with an upper end edge of the shade. Therefore, a quantity of removed light in the high luminous intensity area cut by the upper end edge of the shade can be reduced, and the high luminous intensity area can be shifted to the own lane side. As a result, the driver's visibility can be improved.

Other aspects and advantages of the invention will be apparent from the following description, the drawings and the claims.

DETAILED DESCRIPTION OF THE EXEMPLARY EMBODIMENTS

An exemplary embodiment of a vehicle lighting unit according to the present invention will be explained in detail with reference to the drawings hereinafter.

Figure 1:
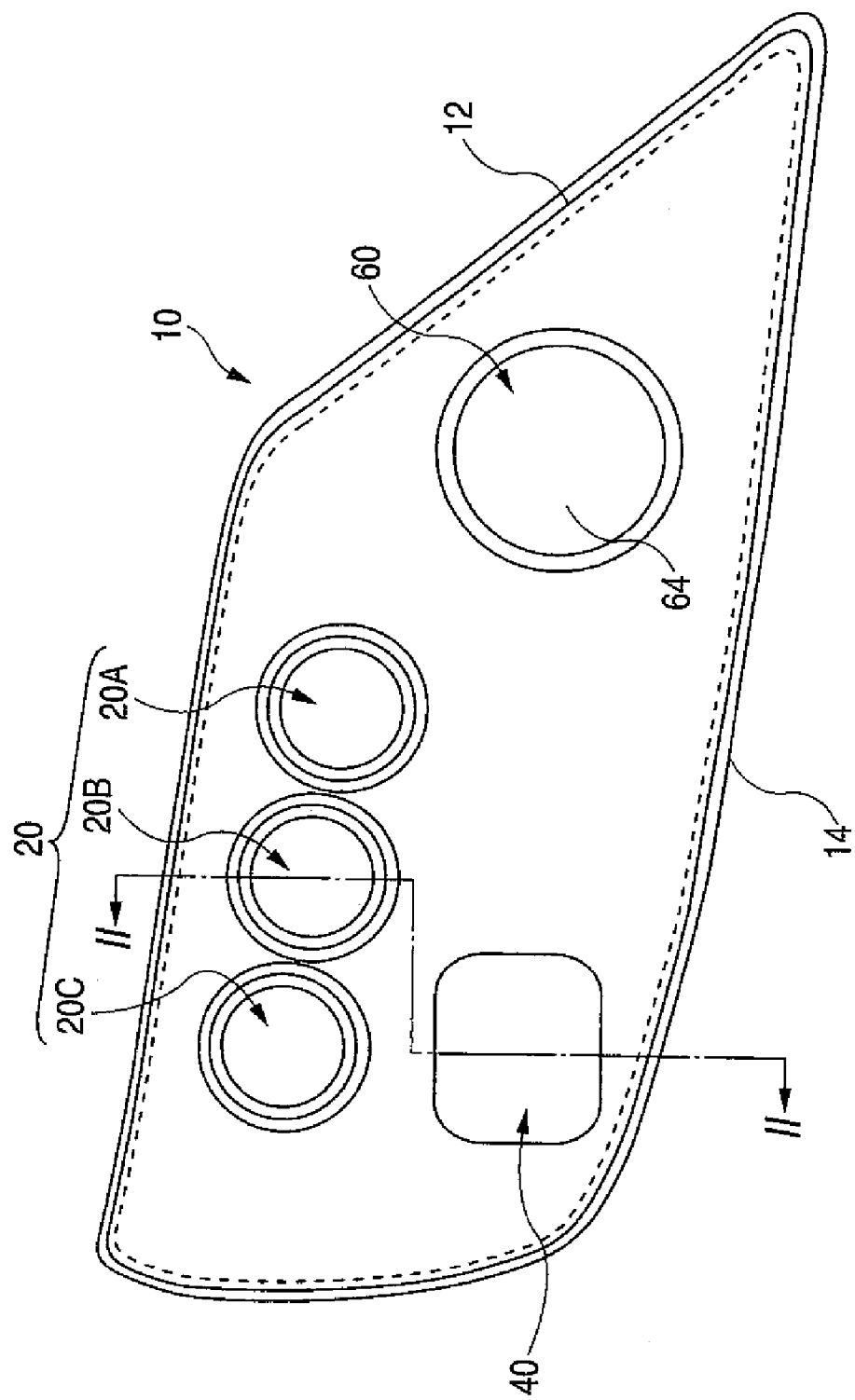
FIG. 1 is a front view showing a vehicle lighting equipment having a vehicle lighting unit according to an exemplary embodiment of the present invention.
Figure 2:
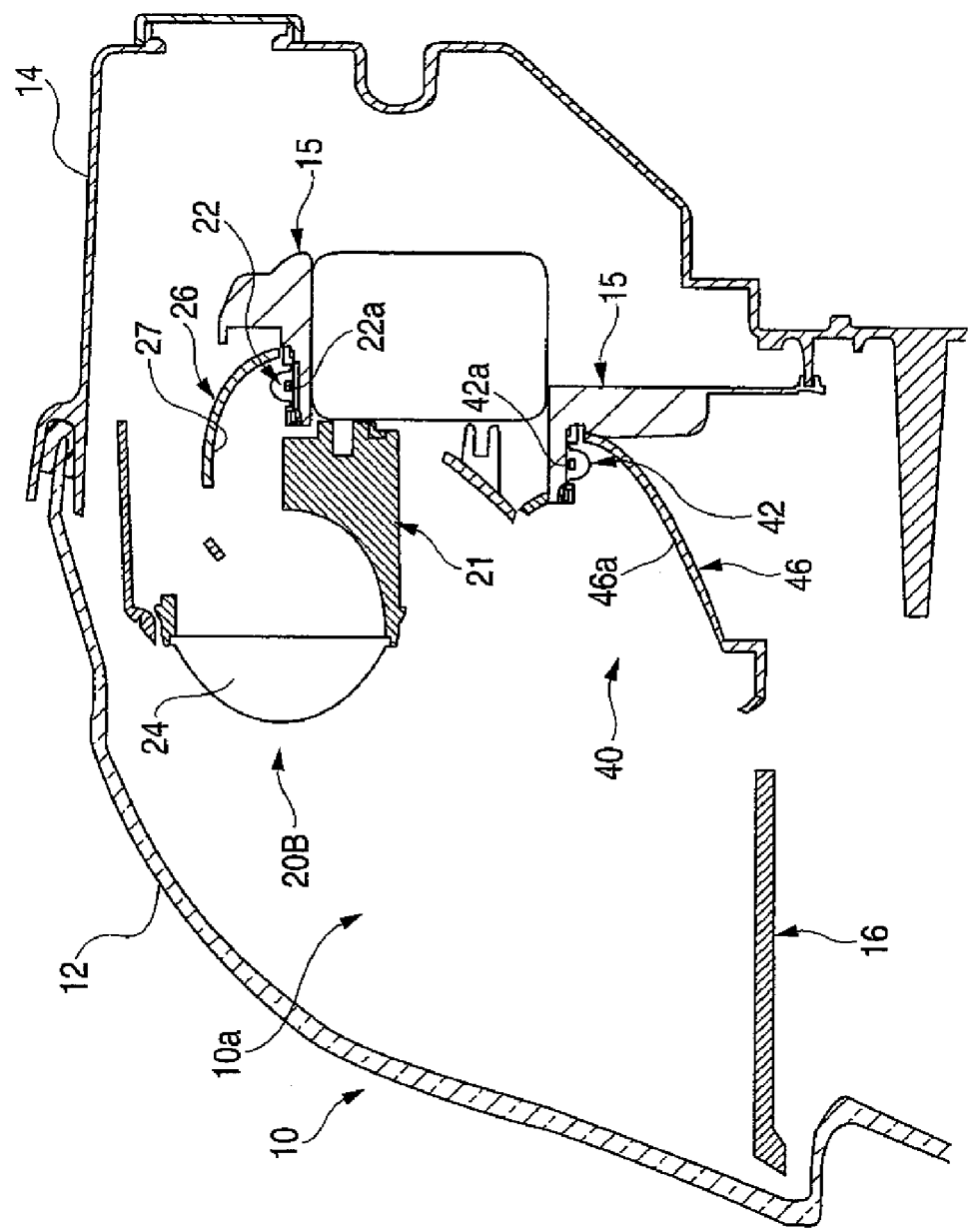
FIG. 2 is a sectional view of the vehicle lighting equipment shown in FIG. 1 and taken along an II-II line.
Figure 3:
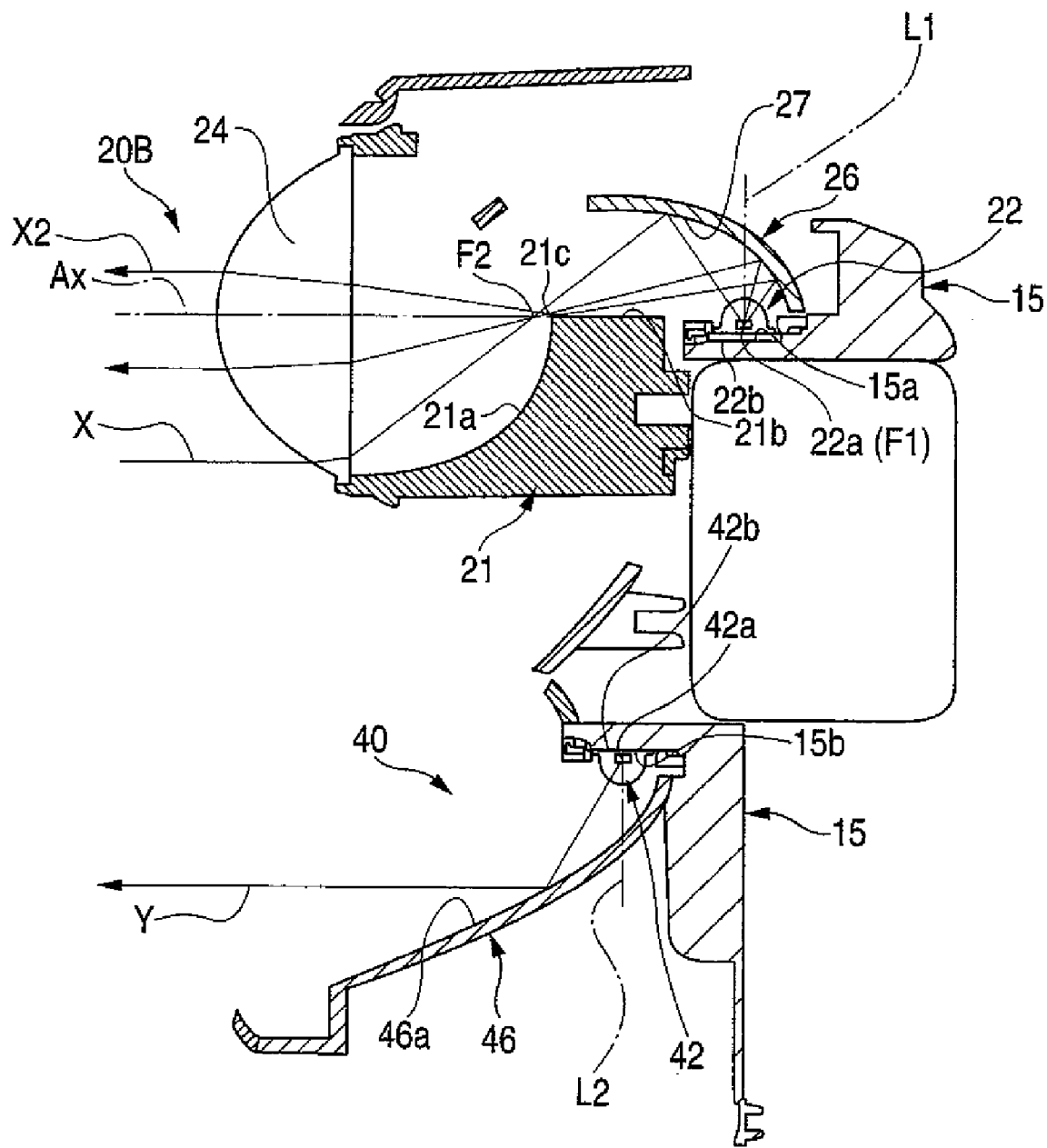
FIG. 3 is a pertinent enlarged view of the vehicle lighting equipment shown in FIG. 2.
Figure 4:
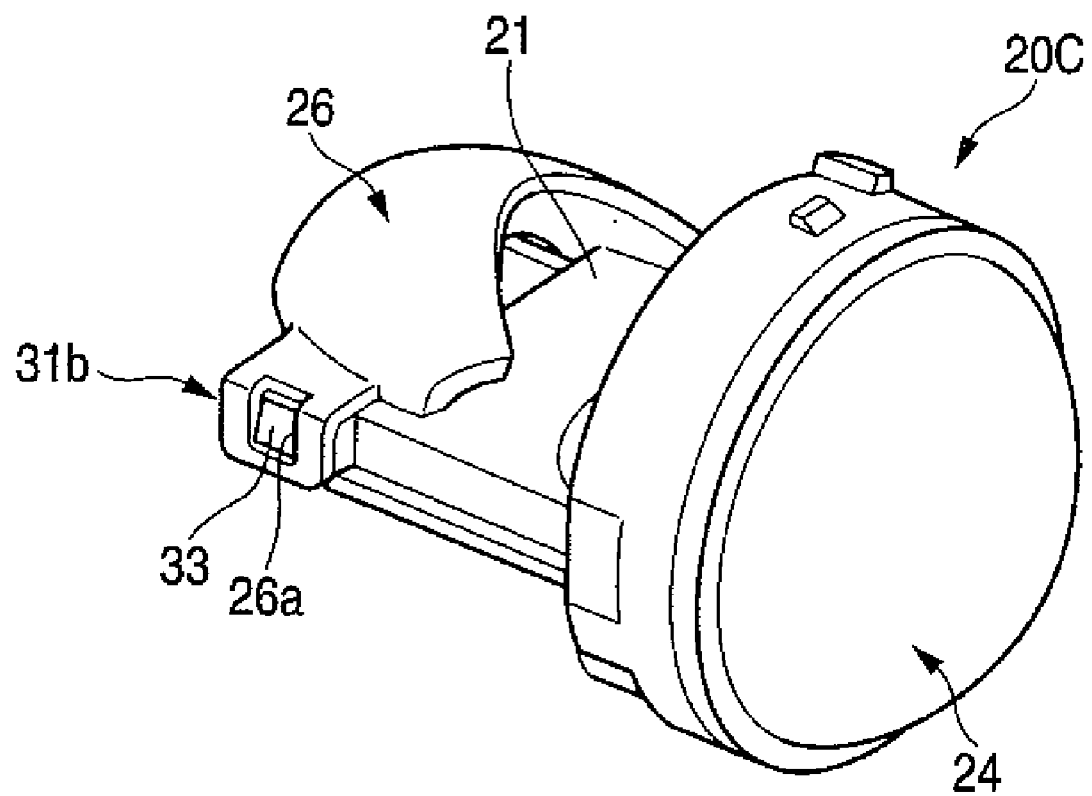
FIG. 4 is a pertinent enlarged perspective view of the vehicle lighting unit shown in FIG. 3.

FIG. 1 is a front view showing a vehicle lighting equipment having a vehicle lighting unit according to the exemplary embodiment of the present invention, FIG. 2 is a sectional view of the vehicle lighting equipment shown in FIG. 1 and taken along an II-II line, FIG. 3 is a pertinent enlarged view of the vehicle lighting equipment shown in FIG. 2, and FIG. 4 is a pertinent enlarged perspective view of the vehicle lighting unit shown in FIG. 3.

A vehicle lighting equipment 10 of the present embodiment is a headlight that is fitted to the front end portion of the vehicle, for example, and can be turned ON/OFF while selectively switching the main-beam (high beam) and the passing-beam (low beam). In FIG. 1, by way of example, a headlight unit (headlamp unit) fitted to the front right portion of a vehicle such as a car, or the like is shown as the vehicle lighting equipment 10.

As shown in FIG. 1 and FIG. 2, the vehicle lighting equipment 10 includes a light-transmissible translucent cover 12, and a lamp body 14. Three vehicle lighting units (a first unit 20, a second unit 40, a third unit 60) are arranged/fixed onto a supporting member 15 made of a die casting, or the like in a lighting chamber 10a that is surrounded by the translucent cover 12 and the lamp body 14. An extension 16 for covering a clearance formed when viewed from the front side of the lighting equipment is arranged between three vehicle lighting units 20, 40, 60 and the translucent cover 12.

The supporting member 15 has a supporting surface 15a to which a fitting surface 22b of a first semiconductor light emitting element (LED) 22 as a first light source of the first unit 20 is fitted, and a supporting surface 15b to which a fitting surface 42b of a second semiconductor light emitting element (LED) 42 as a second light source of the second unit 40 is fitted. The supporting member 15 is fixed to the lamp body 14. This supporting member 15 is fixed to the lamp body 14 via a leveling mechanism (not shown), and can perform optical axis adjustment of respective vehicle lighting units.

Next, the vehicle lighting equipments 20, 40, 60 will be explained hereunder.

The vehicle lighting equipment 10 of the present embodiment is constructed to form the passing-beam light distribution pattern by superposing the lights that are emergent from the first unit 20 and the second unit 40, and to form the main-beam light distribution pattern by the light that is emergent from the third unit 60.

At first, the first unit 20 will be explained hereunder.

The first unit 20 is the vehicle lighting unit that forms a passing-beam light distribution pattern PL together with the second unit 40 described later. As shown in FIG. 1, three sub units 20A, 20B, 20C having the almost same configuration respectively are arranged on an arranging portion over the supporting member 15 to align in the width direction.

The sub units 20A forms a hot-zone forming pattern Pb having a horizontal cut-off line CL1 and an oblique cut-off line CL2 at its upper end edge (see FIG. 8). The sub unit 20B forms a cut-off line forming pattern Pa that is larger than the hot-zone forming pattern Pb under the cut-off line (see FIG. 8). The sub unit 20C forms a dispersing area forming pattern Pc that overlaps with the hot-zone forming pattern Pb and the cut-off line forming pattern Pa under the cut-off line and is expanded laterally rather than the cut-off line forming pattern Pa (see FIG. 8).

As shown in FIG. 2 and FIG. 3, the sub unit 20B (also the sub units 20B, 20C) has the first semiconductor light emitting element 22 as the first light source that is fixed/arranged onto the supporting surface 15a of the supporting member 15, a first main reflector 26 for reflecting forward the light from the first semiconductor light emitting element 22, a shading member (shade) 21 arranged in front of the supporting member 15, and a projection lens 24 held by the shading member 21.

The first semiconductor light emitting element 22 is a white light emitting diode having a light emitting portion (light emitting chip) 22a whose size is about 1 mm×1 mm square, and is provided on the lens center axis Ax that extends in the longitudinal direction of the vehicle. The first semiconductor light emitting element 22 is mounted on the supporting surface 15a of the supporting member 15 in a state that its illumination axis L1 is directed upward in the almost vertical direction that is substantially perpendicular to the illumination direction (leftward direction in FIG. 3) of the sub unit 20B. The light emitting portion 22a may be constructed such that this portion is inclined slightly in answer to the shape of this light emitting portion and the light distribution that is illuminated forward. Also, a plurality of light emitting portions may be provided to one semiconductor light emitting element.

The first main reflector 26 is a reflecting member on the inner side of which a reflecting surface 27 whose vertical sectional shape is an almost elliptic shape and whose horizontal sectional shape is a free curved shape based on an ellipse is formed. The first main reflector 26 is designed/arranged such that a first focal point F1 is located near the light emitting portion 22a of the first semiconductor light emitting element 22 and a second focal point F2 is located near a ridge line (upper end edge of the shade) 21c that is created by a curved surface 21a and a horizontal surface 21b of the shading member 21.

The light that is emergent from the light emitting portion 22a of the first semiconductor light emitting element 22 is reflected on the reflecting surface 27 of the first main reflector 26, then passes near the second focal point F2, and then is incident on the projection lens 24. Also, in the sub unit 20A (the sub unit 20B, the sub unit 20C), the shade for reflecting a part of light on the horizontal surface 21b located on the rear side of the ridge line 21c, as a boundary line, of the shading member 21 to cut the light selectively such that the oblique cut-off line is formed on the light distribution pattern projected in front of the vehicle is constructed. In other words, the ridge line 21c constitutes the light-shade boundary line of the sub unit 20A (the sub unit 20B, the sub unit 20C) as the upper end edge of the shade. That is, the ridge line 21c serves as a portion to form the cut-off line.

In this case, it is preferable that a part of a light X2 that is reflected on the reflecting surface 27 of the first main reflector 26 and then reflected by the horizontal surface 21b of the shading member 21 should be emitted forward as an effective light. Therefore, in the present embodiment, a front side of the vehicle of the horizontal surface 21b of the shading member 21 has an optical shape having a suitable reflecting angle taking a positioning relation between the projection lens 24 and the first main reflector 26 into consideration.

The projection lens 24 is a plano-convex aspheric lens that is made of an acrylic resin and projects the light X reflected by the reflecting surface 27 of the first main reflector 26 ahead of the vehicle. The projection lens 24 is fixed to the top end portion of the shading member 21 on the front side of the vehicle.

The shading member 21 is supported by the lamp body 14, and the first main reflector 26 is fixed to the shading member 21. As shown in FIG. 4, an engaging hole 26a is formed on both side portions of the first main reflector 26 respectively. The first main reflector 26 is fixed by engaging hooking projections 33 of a pair of engaging base portions 31a, 31b, which are provided to project from both left and right sides of the shading member 21 shown in FIG. 4, with the engaging holes 26a from the outside (see FIG. 5B).

Figure 5A:
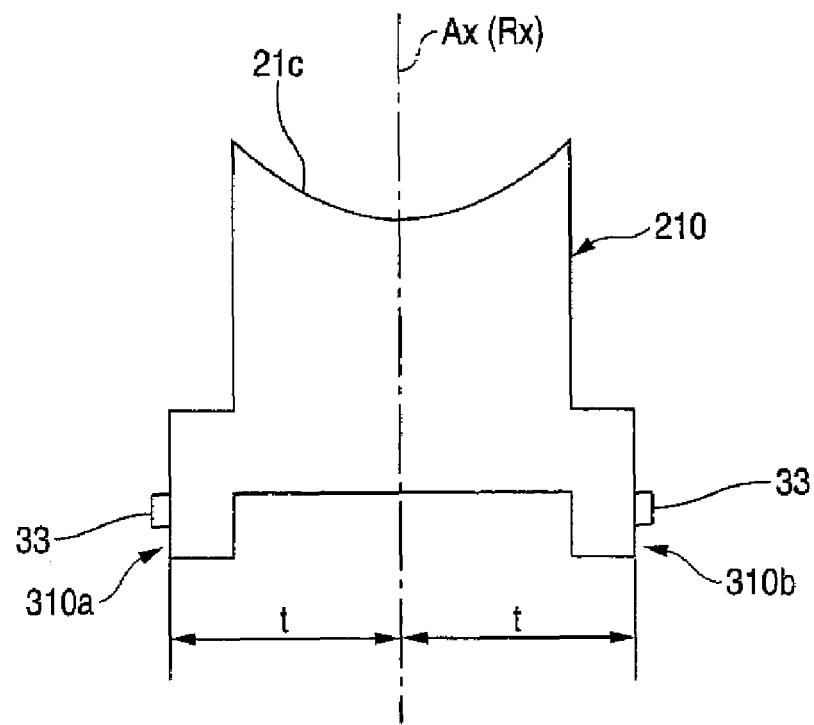
FIG. 5A is a pertinent plan view showing the shade member in a related art.

As shown in FIG. 5A, in a shading member 210 in a related art, a distance t from engaging base portions 310a, 310b on the right and left sides of the shade member 210 to a lens center axis Ax of the projection lens 24 is set equal bilaterally.

Figure 5B:
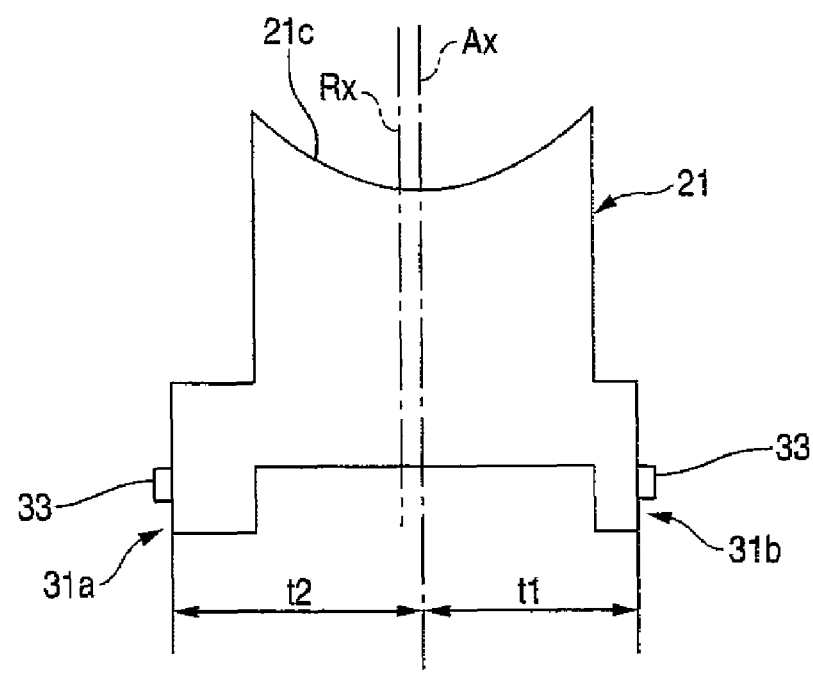
FIG. 5B is a pertinent plan view showing the shade member used in the present embodiment.

In contrast, as shown in FIG. 5B, in the shade member 21 of the present embodiment, distances t1, t2 from the engaging base portions 31a, 31b on both left and right sides to the lens center axis Ax of the projection lens 24 are set differently in response to an amount of shift of an optical axis Rx of the first main reflector 26. In the present embodiment, because thicknesses of the engaging base portions 31a, 31b are changed respectively, the optical axis Rx of the first main reflector 26 is shifted slightly (about 0.2 mm) from the lens center axis Ax of the projection lens 24 (see FIG. 5B).

Next, the second unit 40 will be explained hereunder.

The second unit 40 is the vehicle lighting unit that forms the passing-beam light distribution pattern together with the foregoing first unit 20. The second unit 40 is arranged below the sub unit 20C.

The second unit 40 forms a dispersing area forming pattern Pd is further expanded laterally rather than the dispersing area forming pattern Pc formed by the sub unit 20C of the first unit 20 (see FIG. 8).

As shown in FIG. 2 and FIG. 3, the second unit 40 has the second semiconductor light emitting element 42 arranged fixedly on the supporting surface 15b of the supporting member 15 as the second light source, and a second main reflector 46 for reflecting forward the light from the second semiconductor light emitting element 42.

Like the first semiconductor light emitting element 22, the second semiconductor light emitting element 42 is a white light emitting diode having a light emitting portion 42a. The second semiconductor light emitting element 42 is mounted on the supporting surface 15b of the supporting member 15 in a state that its illumination axis L2 is directed upward in the almost vertical direction that is substantially perpendicular to the illumination direction (leftward direction in FIG. 3) of the second unit 40.

The second main reflector 46 is a reflecting member on the inner side of which a reflecting surface 46a using a parabolic cylindrical plane, an axis of which passing trough the light emitting portion 42a is a focal point, as a reference plane is formed. A light Y emitted from the light emitting portion 42a of the second semiconductor light emitting element 42 is reflected on the reflecting surface 46a of the second main reflector 46 and is irradiated to the front side of the vehicle. That is, the second unit 40 of the present embodiment constitutes the reflector-type vehicle lighting equipment.

Then, the third unit 60 is a vehicle lighting unit that forms the main-beam light distribution pattern. The third unit 60 has a third semiconductor light emitting element (not shown) fixed/arranged onto the supporting member 15 as the third light source, and a projection lens 64.

The projection lens 64 is a convex lens-type aspheric lens that projects the light emitted from the light emitting portion of the third semiconductor light emitting element to the front side of the vehicle. The projection lens 64 is constructed such that a rear focal point of the projection lens 64 agrees substantially with the light emitting portion of the third semiconductor light emitting element (see FIG. 1). Therefore, the light being emergent from the light emitting portion of the third semiconductor light emitting element is incident directly on the projection lens 64, and then the incident light is projected forward along the optical axis as the substantially parallel light. That is, the third unit 60 of the present embodiment constitutes the direct projector-type vehicle lighting equipment.

In the above vehicle lighting equipment 10 of the present embodiment, the first light source of the first unit 20 and the second light source of the second unit 40 are composed of the first semiconductor light emitting element 22 and the second semiconductor light emitting element 42 respectively. Normally, when the semiconductor light emitting elements 22, 42 such as the light emitting diode (LED) having a small size and a small power consumption are employed as the light source of the vehicle lighting equipment 10, a limited electric power can be utilized effectively. Of course, it is needles to say that, as the first light source, the second light source, and the third light source of the vehicle lighting equipment of the present invention, a discharge bulb such as a metal halide bulb using a discharge light emitting portion as the light source, etc., a halogen bulb, and the like can be employed.

Figure 6A:
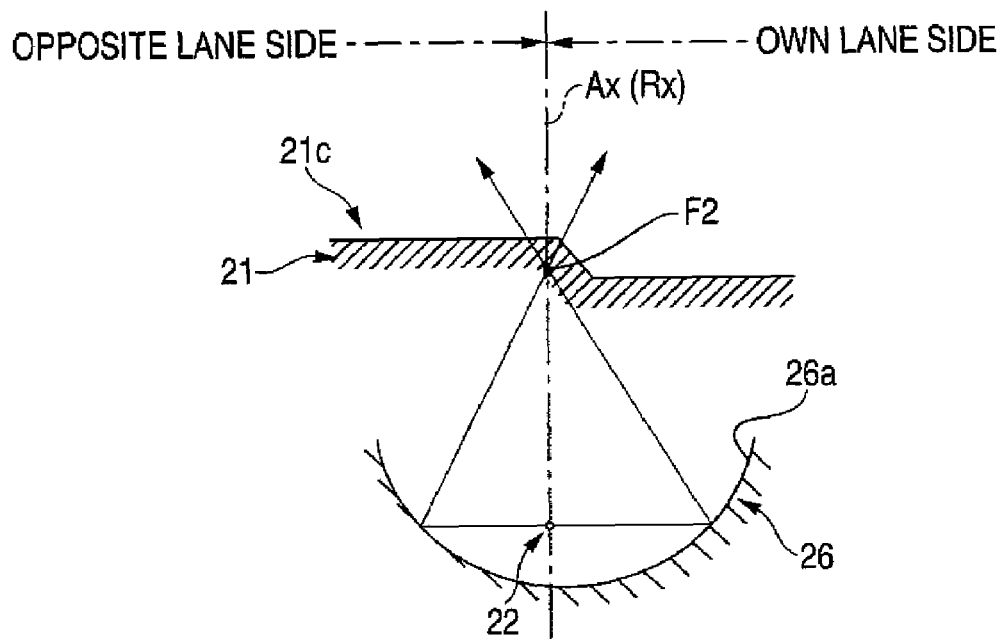
FIG. 6A is a schematic view showing a positional relationship of an optical axis in the related art.
Figure 6B:
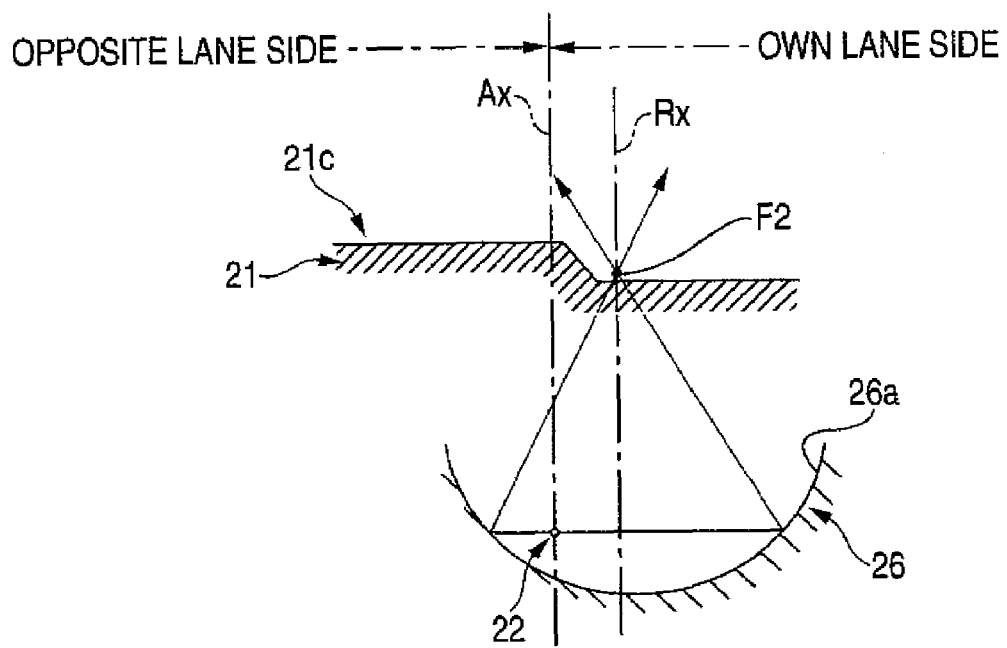
FIG. 6B is a schematic view showing a positional relationship of an optical axis according to the present embodiment.

FIG. 6A is a schematic view showing a positional relationship of an optical axis in the related art, and FIG. 6B is a schematic view showing a positional relationship of an optical axis according to the present embodiment.

As shown in FIG. 6B, in the sub unit 20B of the present embodiment, the optical axis Rx of the reflector is shifted from the lens center axis Ax of the projection lens 24 being set on the ridge line 21c of the shading member 21 to go away from the ridge line 21c. Also, in the present embodiment, the distances t1, t2 from the engaging base portions 31a, 31b on both left and right sides to the lens center axis Ax of the projection lens 24 are set differently in response to an amount of shift of the optical axis Rx of the first main reflector 26. Therefore, the optical axis Rx of the first main reflector 26 is displaced in parallel from the lens center axis Ax of the projection lens 24 to the own lane side in the vehicle width direction (the right side in FIG. 6B).

Figure 7:
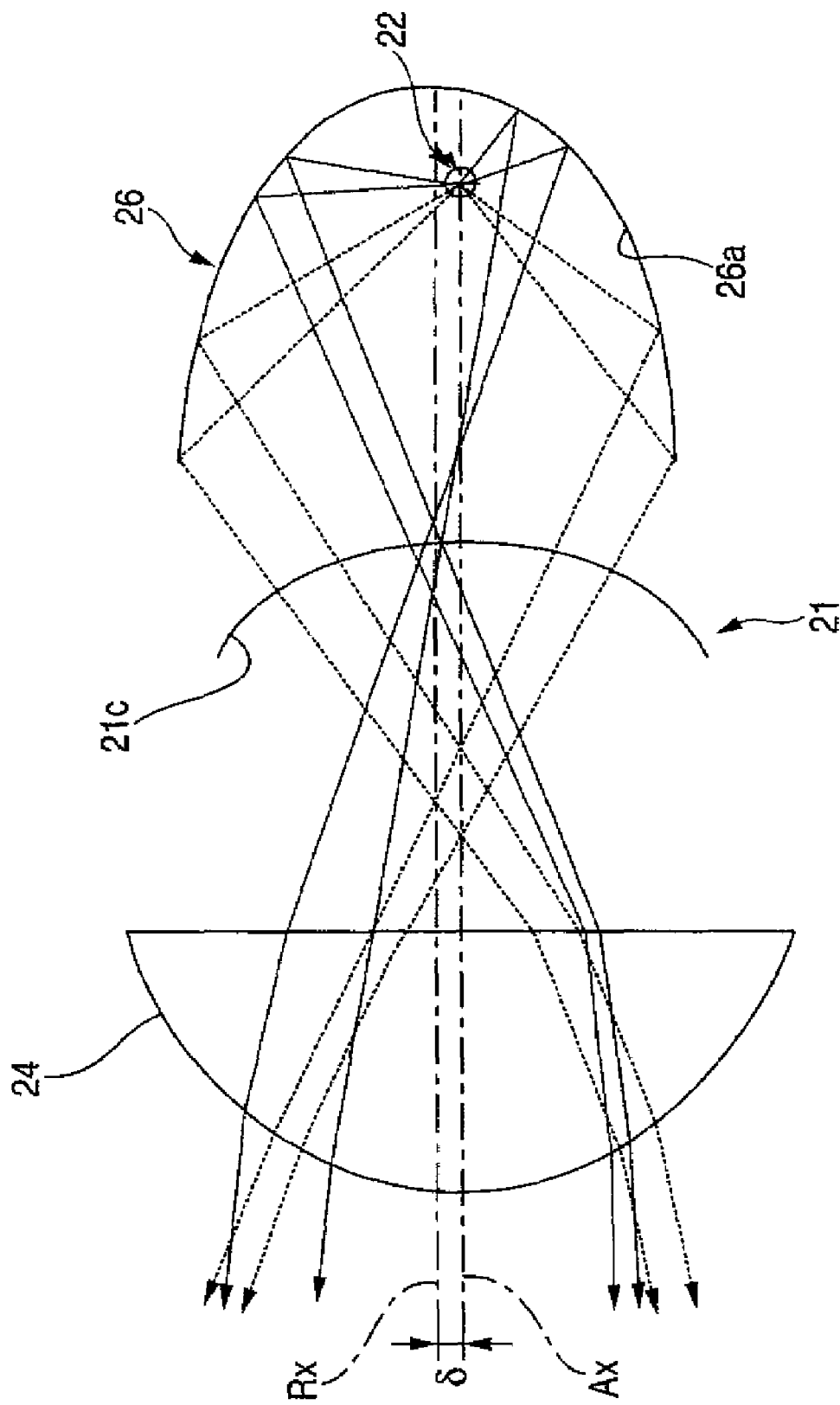
FIG. 7 is a light beam tracing view of the vehicle lighting equipment in which an optical axis of a reflector is shifted.

FIG. 7 is a light beam tracing view of the vehicle lighting equipment in which an optical axis of a reflector is shifted.

As shown in FIG. 7, the optical axis Rx of the first main reflector 26 is displaced in parallel from the lens center axis Ax of the projection lens 24 to the own lane side in the vehicle width direction on the ridge line (upper end edge) 21c of the shading member 21. Therefore, the light that is not incident on the projection lens 24 on account of an optical axis displacement δ can be suppressed to a minute amount generated only by the shift.

In contrast, when the first main reflector 26 is turned on the first semiconductor light emitting element 22 and the optical axis Rx of the first main reflector 26 is displaced obliquely from the lens center axis Ax of the projection lens 24 on the ridge line 21c of the shading member 21, the light that is not incident on the projection lens 24 on account of this optical axis displacement is increased. That is, in the configuration of the present embodiment, the optical axis Rx of the first main reflector 26 is displaced while suppressing a reduction of a utility factor of the light small. Of course, it is needless to say that, when a reduction of a utility factor of the light does not hinder the use of the lighting unit because the first semiconductor light emitting element 22 has an enough quantity of light, the first main reflector 26 may be turned.

Also, the structure for shifting the optical axis Rx of the first main reflector 26 (the engaging base portions 31a, 31b) is provided only to the shading member 21. Therefore, the first main reflector 26 is shifted rightward and fixed to the shading member 21 for the purpose of right light distribution, while the first main reflector 26 is shifted leftward and fixed to the shading member 21 for the purpose of left light distribution.

As a result, a displacement of the optical axis Rx of the first main reflector 26 can be handled only by forming the engaging base portions 31a, 31b into a different shape respectively in the situation that the shading member 21 having different shapes every used area for the purpose of right light distribution and left light distribution must be designed. Thus, the first main reflector 26 can be used as the common use component.

Also, when the shading member 21 and the first main reflector 26 and the first semiconductor light emitting element 22 and the supporting member 15 are fixed separately, the first semiconductor light emitting element 22 and the supporting member 15 can be formed of a lightweight resin, though inferior in thermal resistance, while using the supporting member 15 as the heat radiating member (die casting).

Figure 8A:
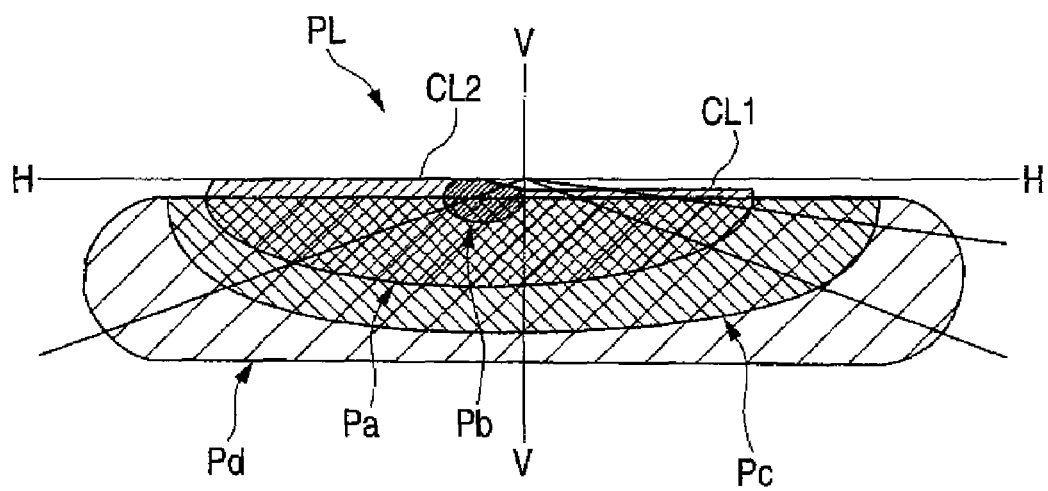
FIG. 8A is a view showing perspectively a light distribution pattern of the present embodiment formed by a light emitted forward from the vehicle lighting equipment on a virtual vertical screen arranged in a position in front of the lighting equipment by 25 m.
Figure 8B:
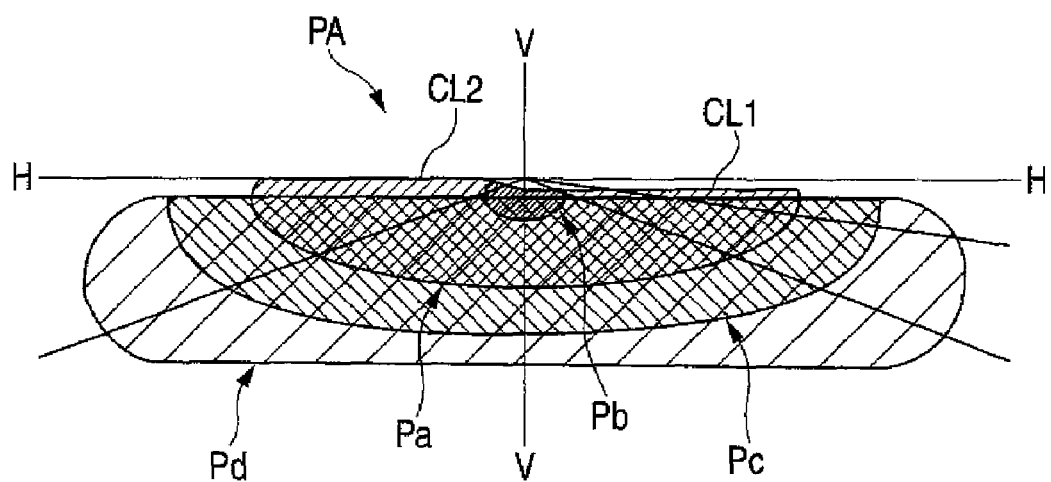
FIG. 8B is a view showing perspectively a light distribution pattern in the related art formed in the same situation.

FIG. 8A is a view showing perspectively a light distribution pattern of the present embodiment formed by a light emitted forward from the vehicle lighting equipment on a virtual vertical screen arranged in a position in front of the lighting equipment by 25 m, and FIG. 8B is a view showing perspectively a light distribution pattern in the related art formed in the same situation.

In the vehicle lighting equipment in the related art, as shown in FIG. 8B, a passing-beam light distribution pattern PA is formed as the light distribution pattern having the oblique cut-off lines CL1, CL2 on which the shape of the ridge line 21c of the shading member 21 is projected. Also, the hot-zone (high luminous intensity area) forming pattern Pb of this passing-beam light distribution pattern PA is formed below the right end portion of the oblique cut-off line of the oblique cut-off line CL2. Also, in the passing-beam light distribution pattern PA, the cut-off line forming pattern Pa and the dispersing area forming pattern Pc, whose luminous intensity is gradually lowered, are formed outward from the hot-zone forming pattern Pb located in the center.

In contrast, in the vehicle lighting equipment 10 of the present embodiment, the high-density luminous flux that is located near the optical axis Rx of the first main reflector 26 and removed considerably in the related art can be incident on the projection lens 24 not to interfere with the ridge line 21c of the shading member 21 so much. Accordingly, as shown in FIG. 8A, the passing-beam light distribution pattern PL in which a quantity of removed light of the hot-zone forming pattern Pb, which is cut by the shading member 21 of the shading member 21, is reduced and the hot-zone forming pattern Pb is shifted to the own lane side is formed.

Therefore, according to the vehicle lighting equipment 10 of the present embodiment, the optical axis Rx of the reflector is shifted from the lens center axis Ax of the projection lens 24 being set to pass through the neighborhood of the ridge line 21c as the upper end edge of the shading member 21 to go away from the ridge line 21c. Therefore, the high-density luminous flux that is located near the optical axis Rx of the first main reflector 26 and removed largely in the related art can be incident on the projection lens 24 not to largely interfere with the ridge line 21c of the shading member 21, a quantity of removed light of the hot-zone that is cut by the shading member 21 can be reduced, and the hot-zone can be shifted to the own lane side. As a result, the driver's visibility can be improved.

In this case, the optical axis Rx of the reflector may be shifted from the lens center axis Ax of the projection lens 24 on the ridge line 21c of the shading member 21. In other words, the first main reflector 26 may be shifted in parallel to the own lane side in the vehicle width direction, otherwise the first main reflector 26 may be turned on the first semiconductor light emitting element 22 and only the portion of the ridge line 21c may be shifted.

Also, the position of the first semiconductor light emitting element 22 may be shifted or not. In this case, when the first semiconductor light emitting element 22 is shifted every used area of the lighting unit, the heat-radiating supporting member (die casting) 15 must be redesigned every used area. Therefore, it is preferable that the first semiconductor light emitting element 22 should not shifted like the above embodiment.

While description has been made in connection with specific embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS 10 vehicle lighting equipment
14 lamp body
15 supporting member
20 first unit
20A sub unit
20B sub unit
20C sub unit
21 shading member (shade)
21c ridge line (upper end edge)

22 first semiconductor light emitting element (light source)
24 projection lens
26 first main reflector (reflector)
31*a*, 31*b* engaging base portion
33 hooking projection
40 second unit
60 third unit
Ax lens center axis of the projection lens
Rx optical axis of the reflector

What is claimed is:

1. A vehicle lighting unit, comprising:
   a projection lens arranged on a lens center axis extending in a longitudinal direction of a vehicle;
   a light source arranged on a rear side of a rear focal point of the projection lens;
   a reflector for reflecting forward a light from the light source toward the lens center axis; and
   a shade, wherein an upper end edge of the shade passes in a vicinity of the rear focal point of the projection lens to shield a part of a reflected light from the reflector;
   wherein an optical axis of the reflector is shifted from the lens center axis that is set to pass through an upper end edge of the shade so that the optical axis of the reflector is apart from the upper end edge, and
   wherein the optical axis of the reflector is shifted in parallel to the lens center axis to an own lane side in a vehicle width direction.

2. The vehicle lighting unit according to claim 1, wherein the light source is fixed to a supporting member,
   the reflector is fixed by a pair of engaging base portions, which are provided to project from the shade on both left and right sides, from an outside, and
   distances from the engaging base portions on both left and right sides to the lens center axis are set differently according to an amount of shift of the optical axis of the reflector.

* * * * *